US012591123B2

(12) United States Patent
Kim et al.

(10) Patent No.: US 12,591,123 B2
(45) Date of Patent: Mar. 31, 2026

(54) METHOD FOR DETERMINING SLOPE OF SLIDE IN SLIDE SCANNING DEVICE, METHOD FOR CONTROLLING SLIDE SCANNING DEVICE AND SLIDE SCANNING DEVICE USING THE SAME

(71) Applicant: Vieworks Co., Ltd., Anyang-si (KR)

(72) Inventors: Byeongyeon Kim, Suwon-si (KR); Yeonhee Park, Namyangju-si (KR)

(73) Assignee: Vieworks Co., Ltd., Anyang-si (KR)

( * ) Notice: Subject to any disclaimer, the term of this patent is extended or adjusted under 35 U.S.C. 154(b) by 0 days.

(21) Appl. No.: 18/947,670

(22) Filed: Nov. 14, 2024

(65) Prior Publication Data

US 2025/0164770 A1      May 22, 2025

(30) Foreign Application Priority Data

Nov. 20, 2023     (KR) ........................ 10-2023-0161000

(51) Int. Cl.
    *G02B 21/08* (2006.01)
    *G02B 21/00* (2006.01)
    *H04N 23/67* (2023.01)
(52) U.S. Cl.
    CPC ......... *G02B 21/008* (2013.01); *H04N 23/675* (2023.01)
(58) Field of Classification Search
    None
    See application file for complete search history.

(56) References Cited

U.S. PATENT DOCUMENTS

| 7,518,652 B2 | 4/2009 | Olson et al. |
| 7,893,988 B2 | 2/2011 | Olson et al. |
| 9,575,308 B2 | 2/2017 | Dixon et al. |
| 10,371,929 B2 | 8/2019 | Hulsken et al. |

(Continued)

FOREIGN PATENT DOCUMENTS

| EP | 1627344 B1 | 6/2014 |
| JP | 2022-542625 A | 10/2022 |

(Continued)

OTHER PUBLICATIONS

Montalto, Michael C et al., "Autofocus methods of whole slide imaging systems and the introduction of a second-generation independent dual sensor scanning method.", Journal of pathology informatics, 2011, 2.1: 44.

*Primary Examiner* — Samuel D Fereja
(74) *Attorney, Agent, or Firm* — Bridgeway IP Law Group, PLLC; Jihun Kim

(57) ABSTRACT

An embodiment relates to a method for determining a slope of a slide in a slide scanning device, which includes: (a) obtaining, by a scanning control unit of a slide scanning device, z-stack images for at least a partial area of a sample of a slide; (b) extracting, by the scanning control unit, a z-axis location of a slice image in which a focus evaluation value has a top value of a predetermined ranking along a plurality of lines of any one of a plurality of rows or a plurality of columns of the z-stack images as a slope calculation z-axis location; and (c) calculating, by the scanning control unit, a slope by using a distance according to a location of a horizontal plane of the plurality of lines and the slope calculation z-axis location, and estimating the calculated slope as the slope of the slide.

17 Claims, 16 Drawing Sheets

1

(56)                           References Cited

U.S. PATENT DOCUMENTS

| 2018/0373015 A1* | 12/2018 | Sakamoto | ............ | G02B 21/367 |
| 2021/0149170 A1 | 5/2021 | Leshem et al. | | |
| 2024/0064400 A1* | 2/2024 | Olson | ................. | G02B 21/002 |

FOREIGN PATENT DOCUMENTS

| JP | 2023-502792 A | 1/2023 |
| KR | 2006-0002653 A | 1/2006 |
| KR | 100589978 B1 | 6/2006 |
| KR | 2009-0023874 A | 3/2009 |
| KR | 2011-0080390 A | 7/2011 |
| KR | 20140045331 A | 4/2014 |
| KR | 101568980 B1 | 11/2015 |
| KR | 102077064 B1 | 2/2020 |
| KR | 2023-0073005 A | 5/2023 |

* cited by examiner

30

(a)

50 px_22

(b)

| -1 | 0 | +1 |
|----|---|----|
| -2 | 0 | +2 |
| -1 | 0 | +1 |

[x-AXIS OPERATOR]

| +1 | +2 | +1 |
|----|----|----|
| 0 | 0 | 0 |
| -1 | -2 | -1 |

[y-AXIS OPERATOR]

| COLUMN | STACK I 1 |
|--------|-----------|
|        | MEAN OF FOCUS EVALUATION VALUES |
| V2     | 52380 |
| V3     | 32340 |
| . . .  | . . . |
| Vk     | 52480 |
| . . .  | . . . |
| Vn-1   | 32400 |

| COLUMN | STACK I 1 MEAN OF FOCUS EVALUATION VALUES | STACK I 2 MEAN OF FOCUS EVALUATION VALUES | STACK I 3 MEAN OF FOCUS EVALUATION VALUES | STACK I 4 MEAN OF FOCUS EVALUATION VALUES | ⋯ | STACK I k MEAN OF FOCUS EVALUATION VALUES |
|---|---|---|---|---|---|---|
| V2 | 52380 | 32340 | 52480 | 52380 | | 32400 |
| V3 | 32380 | 32180 | 22380 | 42330 | | 42010 |
| V4 | 42304 | 23304 | 52304 | 52304 | | 62400 |
| ⋮ | | | | | | |
| Vn-1 | | | | | | |

| MAXIMUM VALUE FOR EACH COLUMN |
|---|
| 52480 |
| 42330 |
| 62400 |
| |
| |

FIG. 8

| COLUMN | STACK I1 MEAN OF FOCUS EVALUATION VALUES | STACK I2 MEAN OF FOCUS EVALUATION VALUES | STACK I3 MEAN OF FOCUS EVALUATION VALUES | STACK I4 MEAN OF FOCUS EVALUATION VALUES | · · · | STACK Ik MEAN OF FOCUS EVALUATION VALUES |
|---|---|---|---|---|---|---|
| V2 | 0.998095 | 0.616235 | 1 | 0.998095 | | 0.617378 |
| V3 | 0.764942 | 0.760217 | 0.528703 | 1 | | 0.99244 |
| V4 | 0.677949 | 0.373462 | 0.838205 | 0.838205 | | 1 |
| · · · | | | | | | |
| Vn-1 | | | | | | |

FIG. 9

(a) Normal slide (b) Tilting slide (Related Art)

(c) Tilting slide (Present Invention)

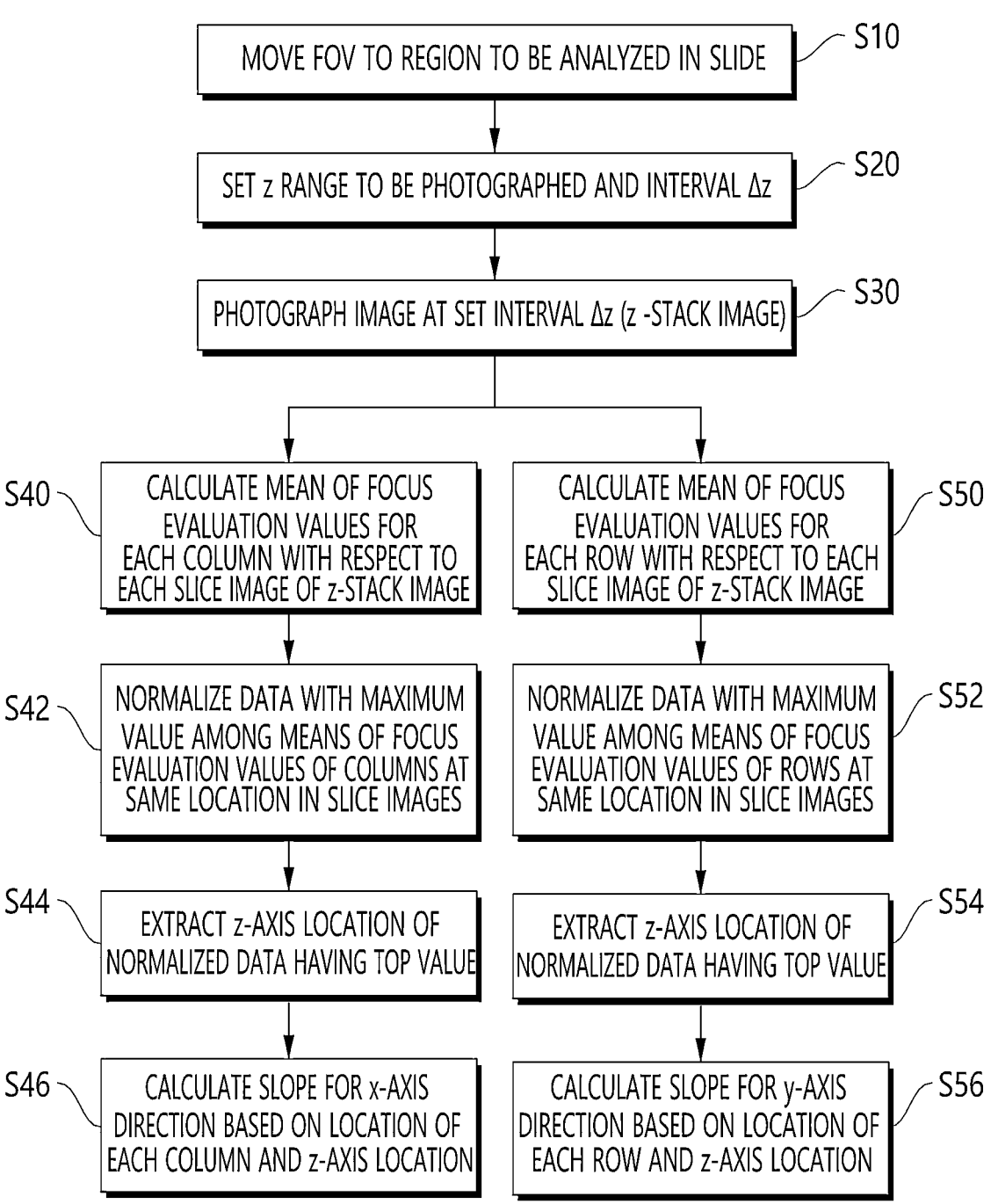

MOVE FOV TO REGION TO BE ANALYZED IN SLIDE — S10

SET z RANGE TO BE PHOTOGRAPHED AND INTERVAL Δz — S20

PHOTOGRAPH IMAGE AT SET INTERVAL Δz (z -STACK IMAGE) — S30

S40 — CALCULATE MEAN OF FOCUS EVALUATION VALUES FOR EACH COLUMN WITH RESPECT TO EACH SLICE IMAGE OF z-STACK IMAGE

CALCULATE MEAN OF FOCUS EVALUATION VALUES FOR EACH ROW WITH RESPECT TO EACH SLICE IMAGE OF z-STACK IMAGE — S50

S42 — NORMALIZE DATA WITH MAXIMUM VALUE AMONG MEANS OF FOCUS EVALUATION VALUES OF COLUMNS AT SAME LOCATION IN SLICE IMAGES

NORMALIZE DATA WITH MAXIMUM VALUE AMONG MEANS OF FOCUS EVALUATION VALUES OF ROWS AT SAME LOCATION IN SLICE IMAGES — S52

S44 — EXTRACT z-AXIS LOCATION OF NORMALIZED DATA HAVING TOP VALUE

EXTRACT z-AXIS LOCATION OF NORMALIZED DATA HAVING TOP VALUE — S54

S46 — CALCULATE SLOPE FOR x-AXIS DIRECTION BASED ON LOCATION OF EACH COLUMN AND z-AXIS LOCATION

CALCULATE SLOPE FOR y-AXIS DIRECTION BASED ON LOCATION OF EACH ROW AND z-AXIS LOCATION — S56

FIG. 15

METHOD FOR DETERMINING SLOPE OF SLIDE IN SLIDE SCANNING DEVICE, METHOD FOR CONTROLLING SLIDE SCANNING DEVICE AND SLIDE SCANNING DEVICE USING THE SAME

CROSS-REFERENCE TO RELATED APPLICATIONS

This application claims priority to and the benefit of Korean Patent Application No. 10-2023-0161000 filed in the Korean Intellectual Property Office on Nov. 20, 2023, the entire contents of which are incorporated herein by reference.

TECHNICAL FIELD

The present invention relates to a slide scanning device. Particularly, the present invention relates to a method for determining a slope of a slide in a slide scanning device, a method for controlling the slide scanning device and a slide scanner.

BACKGROUND ART

A scanning device used in conjunction with a microscope is known. As an example, a slide scanner is a device that can automatically scan a slide put with tissue samples to be inspected to store, observe and/or analyze images. The slide scanner is used to obtain images of tissue samples in various preclinical experiments or pathology tests.

In the slide scanner, the tissue of the slide is photographed by enlargement to several hundreds of times. The image of the tissue is photographed with a small field of view (FOV) and a large-area scan image is generated by stitching the photographed image of the FOV.

Automatic focus technology has been presented as a method for obtaining an image which is in focus on the slide scanner. For example, Michael C. Montalto, etc., presents automatic focus techniques in slide imaging.

However, if the thickness of the tissue put on the slide is not uniform or the slide is inclined by a physical factor, an image that is not in focus may be obtained in the process of scanning the slide. For example, due various causes including a stage on which the slide is put being tilted, the surface of the slide on which the tissue is put being tiled, or an optical axis of a camera and the surface of the stage being not vertical, etc., scanning can be performed while the slide is tilted.

In particular, if the slide is scanned while the slide is tilted, even if the automatic focus technology is applied, it takes a lot of time to explore the focus, which increases the overall scanning time.

SUMMARY OF THE INVENTION

The present invention has been made in an effort to provide a method for determining a slide slope in a slide scanning device for enhancing a photographing speed of the slide scanning device by estimating the slope of the slide. Further, the present invention has been made in an effort to provide a method for controlling the slide scanning device controlling an operation of the slide scanning device by using the slope of the slide.

Further, the present invention has been made in an effort to provide a slide scanner performing slide scanning by estimating the slope of the slide.

An exemplary embodiment of the present invention provides a method for determining a slope of a slide in a slide scanning device, which includes: (a) obtaining, by a scanning control unit of a slide scanning device, z-stack images for at least a partial area of a sample of a slide; (b) extracting, by the scanning control unit, a z-axis location of a slice image in which a focus evaluation value has a top value of a predetermined ranking along a plurality of lines of any one of a plurality of rows or a plurality of columns of the z-stack images as a slope calculation z-axis location; and (c) calculating, by the scanning control unit, a slope by using a distance according to a location of a horizontal plane of the plurality of lines and the slope calculation z-axis location, and estimating the calculated slope as the slope of the slide.

In an exemplary embodiment, in step (b) above, the plurality of lines may include a first line to an m-th line (m is a natural number of 2 or more), the slice image may include a first slice image to a k-th slice image in a z-axis direction, the scanning control unit may calculates focus evaluation values of the first line to the m-th line of each of the first slice image to the k-th slice image, and the scanning control unit may extract, as the slope calculation z-axis location, the z-axis location of the slice image in which the focus evaluation value has the top value of the predetermined ranking with respect to each of the first line to the m-th line.

In an exemplary embodiment, each of the focus evaluation values of the first line to the m-th line may be a mean of focus evaluation values acquired by averaging focus evaluation values of pixels included in the corresponding line with respect to each of the first line to the m-th line of each of the first slice image to the k-th slice image.

In an exemplary embodiment, the mean of the focus evaluation values may be normalized with a maximum value of the means of the focus evaluation values included in the corresponding line with respect to each of the first line to the m-th line.

In an exemplary embodiment, the calculated slope may be calculated by applying a linear regression by using the normalized focus evaluation values.

In an exemplary embodiment, the focus evaluation value of the pixel may be calculated by using any one of a Tenengrad function, a Squared Gradient function, a Brenner function, a Variance function, or a Laplacian function.

In an exemplary embodiment, the estimated slope may be a slope at which the slide forms with respect to a plane perpendicular to an optical axis of the image photographing unit.

In an exemplary embodiment, the plurality of lines may be a plurality of columns of the z-stack image, and the estimated slope may be a slope of the slide in a first direction.

In an exemplary embodiment, the plurality of lines may be a plurality of rows of the z-stack image, and the estimated slope may be a slope of the slide in a second direction.

Another exemplary embodiment of the present invention provides a slide scanning device including: a stage on which a slide is mounted; an image photographing unit acquiring an image of a sample of the slide; and a scanning control unit controlling the image photographing unit or the stage so as to scan the image of the sample, in which the scanning control unit may include a slope calculation unit performing the method for determining the slope of the slide.

In an exemplary embodiment, the scanning control unit may further include a focus map generation unit searching a focal location in a focus map generation FOV in z-stack images obtained in focus map generation FOVs at a plurality of locations of the sample, and generating a focus map for the sample.

In an exemplary embodiment, the scanning control unit may set a focal location of the image photographing unit in a specific FOV according to the focus map, and adjust the focal location of the image photographing unit in an FOV subsequent to the specific FOV according to the slope of the slide estimated by the slope calculation unit.

In an exemplary embodiment, the focus map generation unit may correct the focus map according to the slope of the slide estimated by the slope calculation unit.

In an exemplary embodiment, the slope calculation unit may estimate the slope of the slide by using the z-stack images acquired in at least one of the focus map generation FOVs.

Another exemplary embodiment of the present invention provides a method for controlling a slide scanning device including a stage on which a slide is mounted, an image photographing unit acquiring an image of a sample of the slide, and a scanning control unit controlling the image photographing unit or the stage so as to scan the image of the sample, which includes: a focus map generation step of searching, by the scanning control unit, a focal location in a plurality of focus map generation FOVs with respect to the sample, and generating a focus map; a slide slope determining step of determining, by the scanning control unit, the slope of the slide; an image acquisition step of driving, by the scanning control unit, the image photographing unit and the stage to acquire a plurality of tile images for the sample by the image photographing unit; and an image generation step of stitching the plurality of tile images and generating a slide image for the sample.

In an exemplary embodiment, in the image acquisition step, the scanning control unit may set a focal location of the image photographing unit in a specific FOV according to the focus map, and adjust the focal location of the image photographing unit in an FOV subsequent to the specific FOV according to the slope of the slide determined in the slope determination step.

In an exemplary embodiment, the method may further include a focus map correcting step of correcting the focus map according to the slope of the slide estimated by the slope calculation unit.

According to an exemplary embodiment of the present invention, there is an effect in that a slope of a slide is estimated within a short time, and a slide scanning device can be controlled by using the estimated slope to shorten a scanning time of the slide scanning device, and obtain a slide image which is in focus overall.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 8 is a diagram illustrating calculating a mean of the focus evaluation values for each column with respect to each slice image of the Z-stack images in the slide scanning device according to an exemplary embodiment of the present invention.

FIG. 9 is a diagram illustrating that the mean of the focus evaluation value is normalized for each column with respect to each slice image of the Z-stack images in the slide scanning device according to an exemplary embodiment of the present invention.

FIG. 15 is a flowchart illustrating a method for determining a slide slope of the slide scanning device according to an exemplary embodiment of the present invention.

Figure 1:
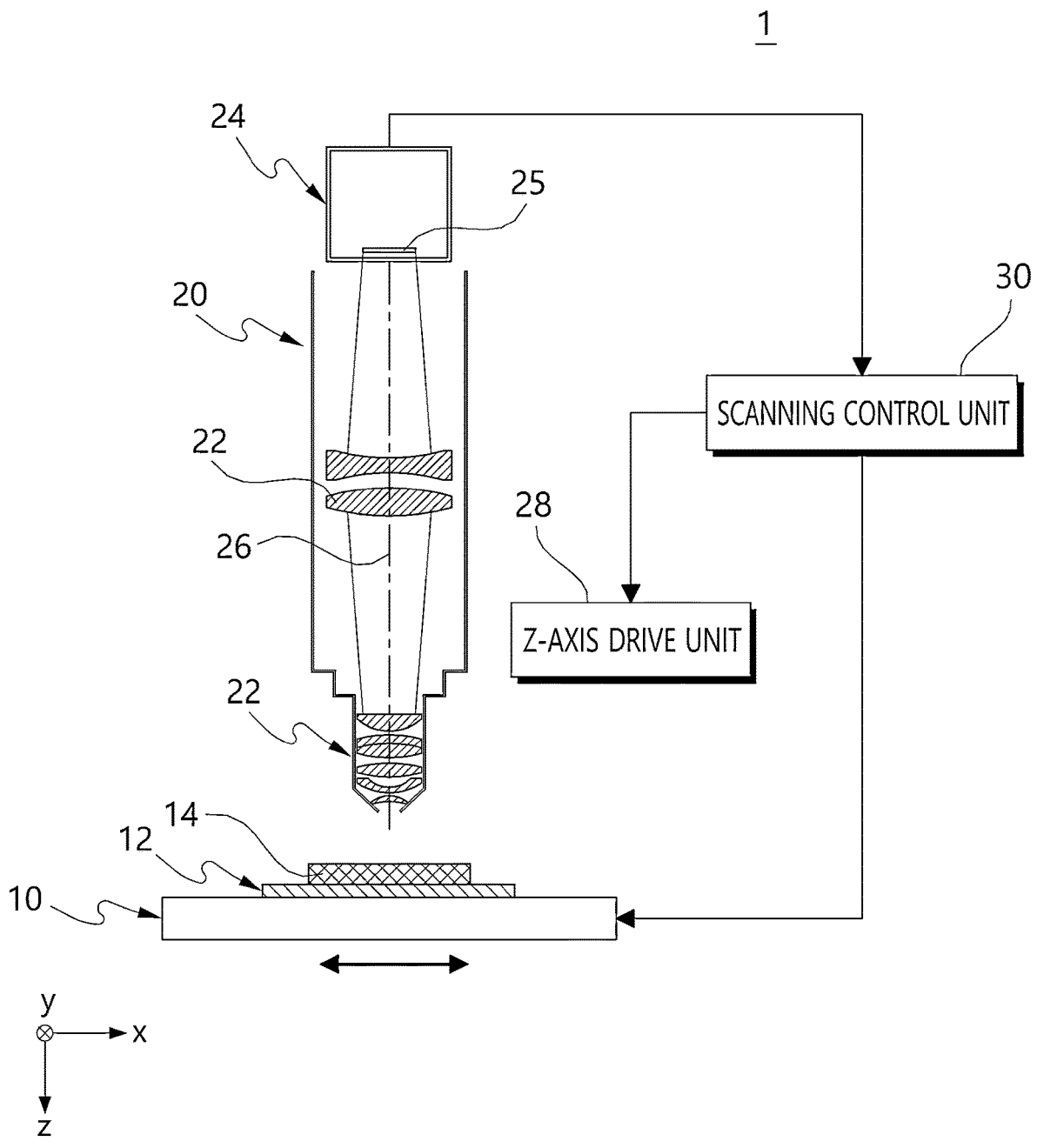
FIG. 1 is a diagram illustrating a slide scanning device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The present invention may have various transformations and various exemplary embodiments and specific exemplary embodiments will be illustrated in the drawings and described in detail in the detailed description. However, this does not limit the present invention within specific embodiments, and it should be understood that the present invention covers all the modifications, equivalents and replacements within the technical idea and technical scope of the present invention. In describing the present invention, a detailed description of related known technologies will be omitted if it is determined that they make the gist of the present invention unclear.

Terms including as first, second, and the like are used for describing various components, but the components are not limited by the terms. The terms are used only to discriminate one component from another component.

Terms used in the present invention are used only to describe specific embodiments, and are not intended to limit the present invention. Terms used in the present invention adopt general terms which are currently widely used as possible by considering functions in the present invention, but the terms may be changed depending on an intention of those skilled in the art, a precedent, or emergence of new technology, etc. Further, in a specific case, a term which an applicant arbitrarily selects is present and in this case, a meaning of the term will be disclosed in detail in a corresponding description part of the invention. Accordingly, a term used in the present invention should be defined based on not just a name of the term but a meaning of the term and contents throughout the present invention.

A singular form includes a plural form if there is no clearly opposite meaning in the context. In the present invention, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Hereinafter, the exemplary embodiments of the present invention will be described in detail with reference to the accompanying drawings, in which like reference numerals refer to like or corresponding elements and a duplicated description thereof will be omitted when the exemplary embodiments are described with reference to the drawings.

Figure 2:
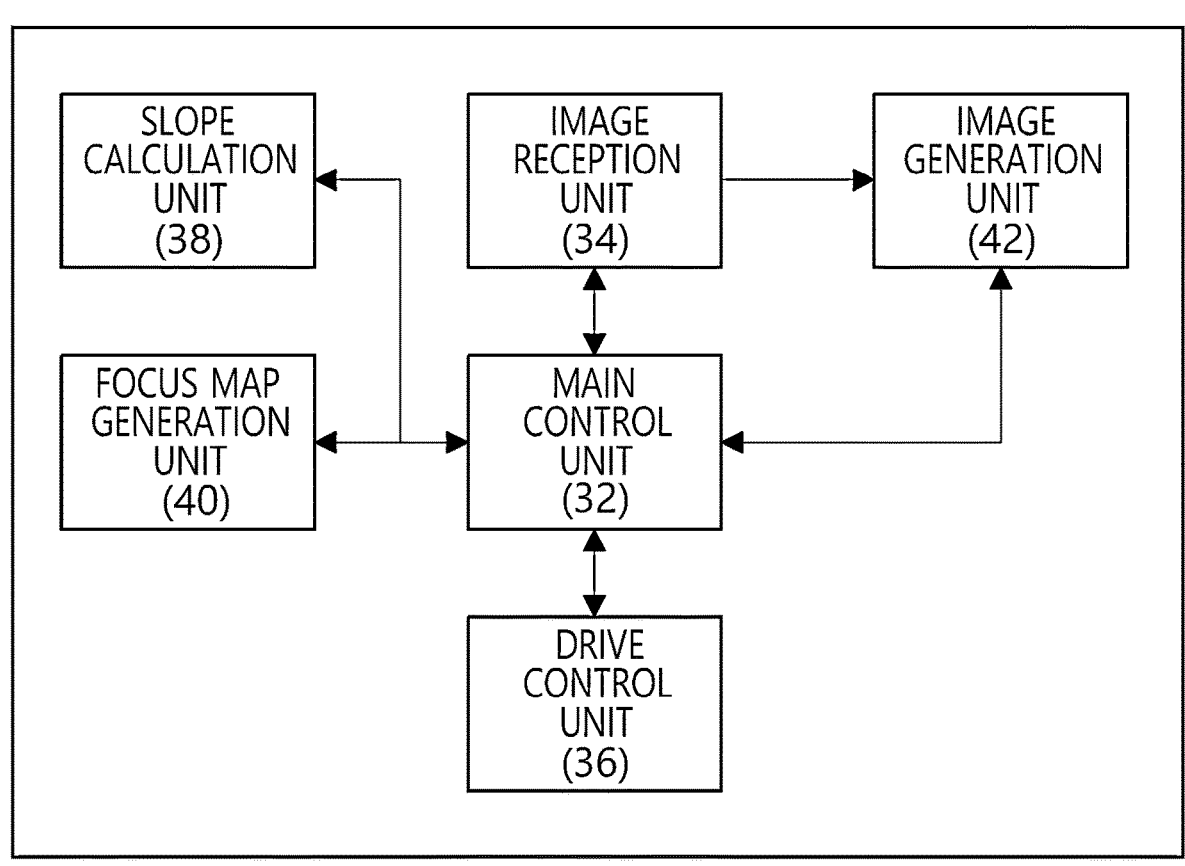
FIG. 2 is a block diagram illustrating a configuration of a scanning control unit of the slide scanning device according to an exemplary embodiment of the present invention.

FIG. 1 is a diagram illustrating a slide scanning device according to an exemplary embodiment of the present invention, and FIG. 2 is a block diagram illustrating a configuration of a scanning control unit of the slide scanning device according to an exemplary embodiment of the present invention.

The slide scanning device 1 according to an exemplary embodiment of the present invention includes a stage 10 mounted with a slide 12 on which a sample 14 to be scanned is put, an image photographing unit 20 photographing an image for the slide 12, and a scanning control unit 30 controlling operations of the stage 10 and the image photographing unit 20.

The stage 10 is movable in a first direction (e.g., hereinafter, the first direction will be described as an x-axis direction of FIG. 1) by the control of the scanning control unit 30. However, in the exemplary embodiment of the present invention, the stage 10 may be fixed and an objective lens 22a may move in the x-axis or an optical axis 26 may be configured to move using an additional optical structure. The stage 10, and the optical axis 26 for obtaining the image may be understood to be relatively movable in the x-axis direction. Further, the stage 10 is also movable in a second direction (e.g., hereinafter, the second direction will be described as a y-axis direction which is vertical to the x-axis direction on a plane) by the control of the scanning control unit 30.

The image photographing unit 20 may include lenses 22a and 22b receiving light from a sample 14, and an image sensor unit 24 including an image sensor 25. In an exemplary embodiment, the lenses 22a and 22b may include an objective lens 22a disposed opposite to the sample 14, and a tube lens 22b for imaging. The image sensor 25 may be implemented as an imaging element such as a charge coupled device (CCD) or a complementary metal-oxide semiconductor (CMOS). Further, the image sensor 25 may adopt any one of a line scan mode or area scan mode. Meanwhile, in FIG. 1, reference numeral 26 represents an optical axis of the image photographing unit 20.

Meanwhile, the image photographing unit 20 may further include a z-axis drive unit 28. In an exemplary embodiment, the z-axis drive unit 28 may be implemented as a stepping motor, and may perform a function of adjusting a focal distance of the image photographing unit 20. In an exemplary embodiment, the z-axis drive unit 28 drives the entirety of the image photographing unit 20 in a z-axis direction or drives the objective lens 22a or the tube lens 22b in the z-axis direction to adjust a focal distance according to the optical axis 26.

The scanning control unit 30 controls the stage 10 and the image photographing unit 20 to acquire an image for the sample 14 put on the slide 12. In an exemplary embodiment, the scanning control unit 30 drives the stage 10 or the image photographing unit 20 in an x-axis direction and/or a y-axis direction according to a set field of view (FOV) and adjusts the focal distance by driving the z-axis drive unit 28 in the z-axis direction, thereby acquiring the image for the sample 14. Further, the scanning control unit 30 may stitch images obtained according to a plurality of FOVs to generate an image including at least a partial area of the sample 14.

In the present invention, the scanning control unit 30 may determine a slope of the slide 12 mounted on the stage 10. In an exemplary embodiment, the slope may represent a degree at which the stage 10 is tilted with respect to the x-axis direction (i.e., with respect to a yz plane). Further, the slope may represent a degree at which the stage 10 is tilted with respect to the y-axis direction (i.e., with respect to an xz plane).

In an exemplary embodiment, the scanning control unit 30 may calculate a focal location in the FOV at a specific location, and generate a focus map for the slide 12, with respect to the sample 14 put on the slide 12. Further, the scanning control unit 30 may correct the focus map by considering the slope of the slide 12.

Referring to FIG. 2, the scanning control unit 30 includes a main control unit 32, an image reception unit 34, a drive control unit 36, a slope calculation unit 38, a focus map generation unit 40, and an image generation unit 42.

The main control unit 32 controls a function of the scanning control unit 30 overall.

The image reception unit 34 receives the photographed image from the image photographing unit 20.

The drive control unit 36 controls the stage 10 and/or the z-axis drive unit 28 according to control of the main control unit 32 to adjust a location of the FOV of the image photographing unit 20 and a focal distance of the image photographing unit 20.

The slope calculation unit 38 calculates the slope of the slide 12 based on the image for the sample 14 obtained by the control of the main control unit 32.

The focus map generation unit 40 may generate the focus map for the sample 14 by setting an ideal focal location in which the image is well in focus by using z-stack images obtained at a plurality of locations of the sample 14 by the control of the main control unit 32.

The image generation unit 42 stitches the images photographed in the plurality of FOVs for the sample 14 to generate an image for at least a partial area of the sample 14.

Figure 3:
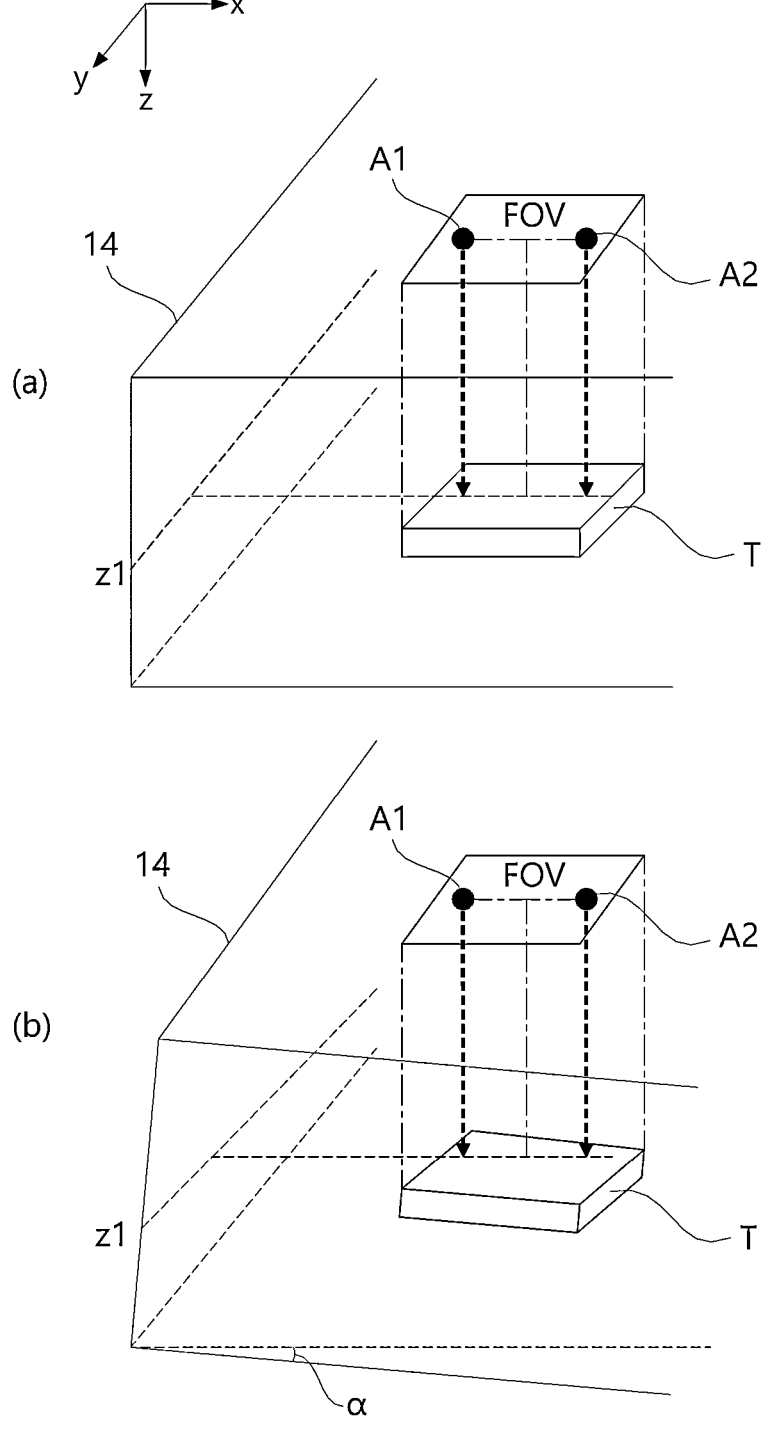
FIG. 3 is a diagram for describing a difference in focus evaluation value between a state (part (a) of FIG. 3) in which a slide is not tilted and a state (part (b) of FIG. 3) in which the slide is tilted in the slide scanning device.

FIG. 3 is a diagram for describing a difference in focus evaluation value between a state (part (a) of FIG. 3) in which a slide is not tilted and a state (part (b) of FIG. 3) in which the slide is tilted in the slide scanning device.

Referring to FIG. 3, the sample 14 put on the slide 12 and a tissue T included in the sample 14 are displayed. In the state of part (a) of FIG. 3, the slide 12 is mounted not to be tilted on the stage 10. Since the FOV is set to be very small (e.g., width×length is 100×100 μm to 1000×1000 μm) in the slide scanning device 1, tissues T positioned in the same FOV may be supposed to be positioned at substantially the same height in the z-axis direction. Referring to part (a) of FIG. 3, a z-axis direction distance from point A1 up to the tissue T in the FOV is substantially the same as a z-axis direction distance from point A2 up to the tissue T as z1. Accordingly, a focus evaluation value acquired by evaluating a focus by setting a z1 location at point A1 as the focal location and obtaining the image will be almost equal to a focus evaluation value acquired by evaluating the focus by setting the z1 location at point A2 as the focal location and obtaining the image (a mode of calculating the focus evaluation value will be described later).

However, as in part (b) of FIG. 3, in a state in which the slide 12 is tilted, the optical axis 26 of the image photographing unit 20 is illustrated in part (a) of FIG. 3, but the sample 14 is tilted with respect to the x-axis direction. As a result, when the z-axis direction distance from point A1 up to the tissue T is z1, the z-axis direction distance from point A2 up to the tissue T is larger than z1. Accordingly, the focus evaluation value acquired by evaluating a focus by setting the z1 location at point A1 as the focal location and obtaining the image will be calculated to be excellent, but the focus evaluation value acquired by evaluating the focus by setting the z1 location at point A2 as the focal location and obtaining the image will be calculated to be low.

The present invention has one feature in providing a method for effectively estimating a physical slope of the slide 12 mounted on the stage 10 by considering a phenomenon illustrated in FIG. 3, and a slide scanning device 1 adopting the same.

Hereinafter, a method for estimating the slope of the slide 12 in the slide scanning device 1 according to the present invention will be described.

Figure 4:
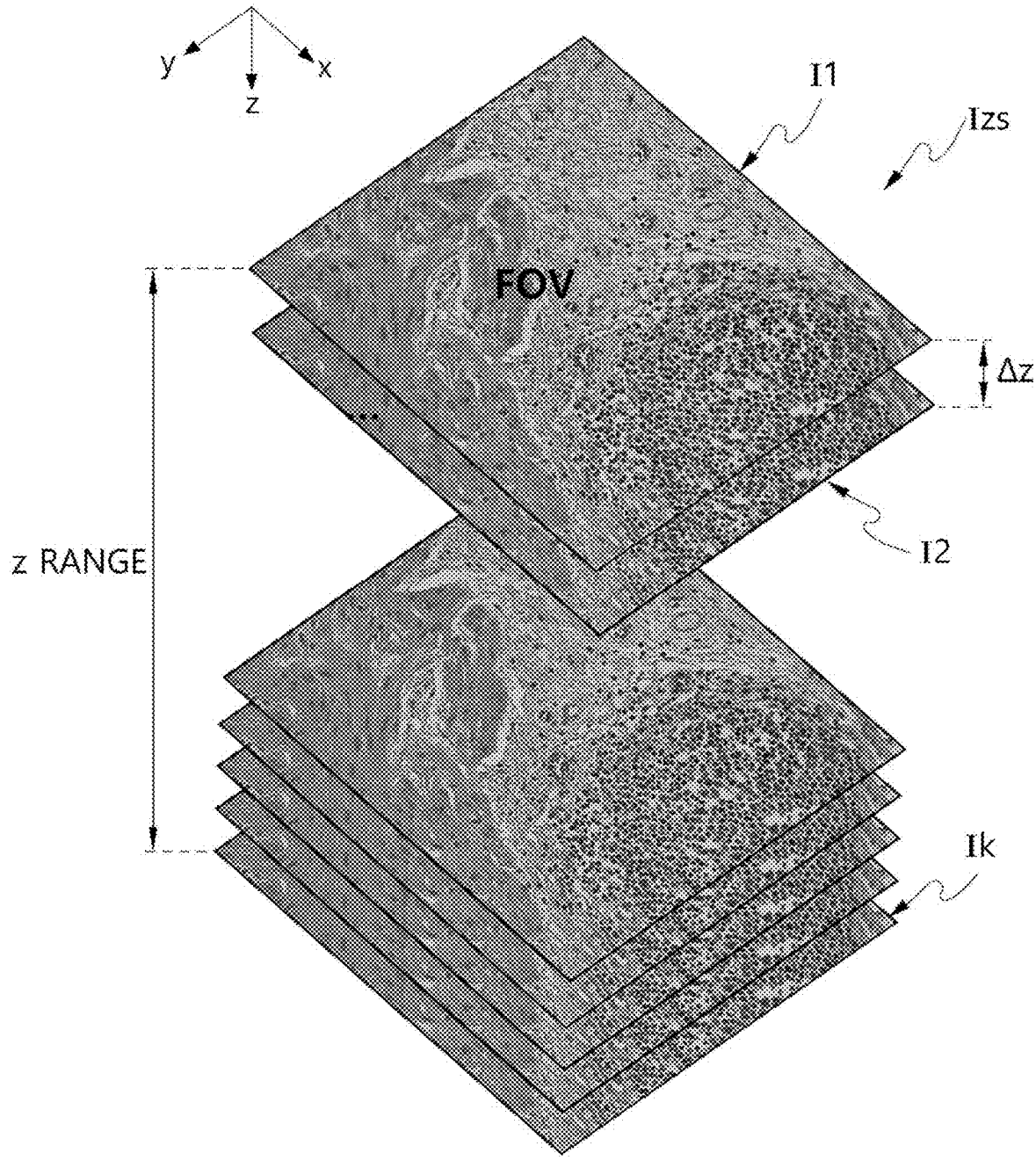
FIG. 4 is a diagram illustrating that Z-stack images are acquired by adjusting a focal distance at a predetermined interval in the slide scanning device according to an exemplary embodiment of the present invention.
Figure 5:
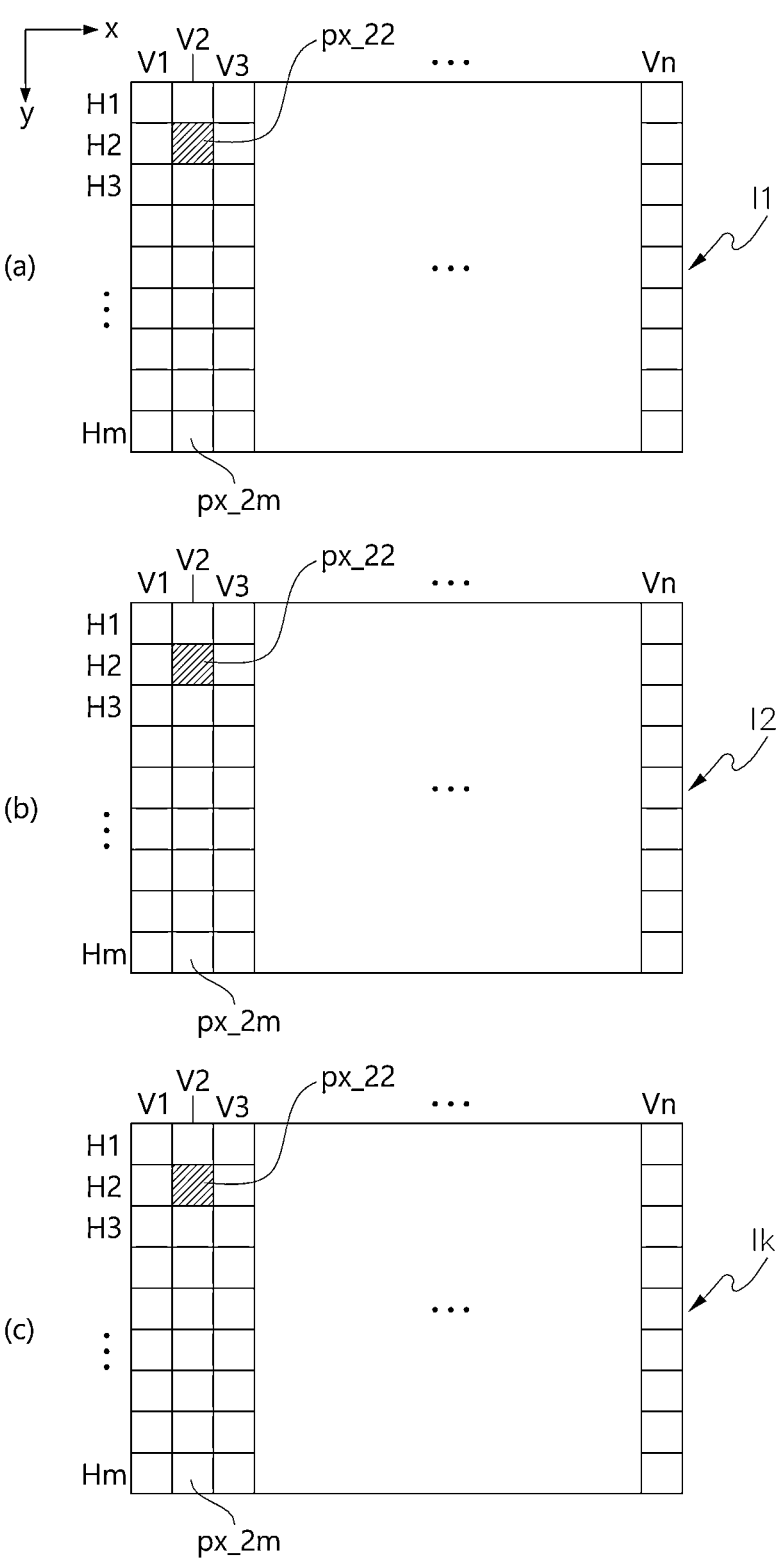
FIG. 5 is a diagram exemplarily illustrating the Z-stack images in the slide scanning device according to an exemplary embodiment of the present invention.

FIG. 4 is a diagram illustrating that Z-stack images are acquired by adjusting a focal distance at a predetermined interval in the slide scanning device according to an exemplary embodiment of the present invention, and FIG. 5 is a diagram exemplarily illustrating the Z-stack images in the slide scanning device according to an exemplary embodiment of the present invention.

Z-stack images Izs according to the FOV are acquired at a location on any xy plane in the sample 14. The z-stack images Izs may be acquired while changing the focal location of the image photographing unit 20 so as to have a predetermined interval Δz within a predetermined range of the z axis. The z-stack images Izs include a plurality of slice images I1, I2, . . . , Ik according to each focal location. The location on the xy plane of the FOV may be arbitrarily set. In an exemplary embodiment, an area for the FOV for estimating the slope of the slide 12 may be set to be the same as an area of the FOV for generating the focus map for the sample 14. Further, in an exemplary embodiment, the z-stack images for any FOV area may be used simultaneously for estimating the slope of the slide 12 and generating the focus map. However, in the exemplary embodiment of the present invention, it is also possible that a location of the FOV for estimating the slope of the slide and a location of the FOV for generating the focus map are set to be different from each other.

The drive control unit 36 controls the image photographing unit 20 and the stage 10 according to the control of the main control unit 32 of the scanning control unit 30 to locate the FOV of the image photographing unit 20 in a predetermined area of the sample 14, and photograph the z-stack images while changing the focal location of the image photographing unit 20. The image reception unit 34 receives the z-stack images from the image photographing unit 20 and the slope calculation unit 38 processes the received z-stack images to estimate the slope of the slide 12.

Referring to FIG. 5, each of slice images I1, I2, . . . , Ik included in the z-stack images Izs has a resolution of n×m, and columns of V1 to Vn and rows of H1 to Hm. In the present invention, in some cases, a term ⌈line⌋ of the z-stack images or the slice image may be used, and the line may be used as a meaning which refers to any one of the column and the row.

In the present invention, in determining the slide slope by the slide scanning device, a mean of the focus evaluation values is calculated for each row or for each column with respect to each of the slice images I1, I2, . . . , Ik of the z-stack images Izs, a maximum value of the mean of the focus evaluation values is found for rows of the same location or for columns of the same location in a plurality of slice images I1, I2, . . . , Ik, the focus evaluation values are normalized for rows of the same location or for columns of the same location with the maximum value of the mean of the focus evaluation values, and a slope of the slide 12 is calculated by using the normalized focus evaluation values. In an exemplary embodiment, the slope may be appreciated as meaning a relative slope of a horizontal plane of the slide 12 for the optical axis 26 of the image photographing unit 20.

Referring to FIG. 3, it may be anticipated that the slope of the slide 12 for the x-axis direction is estimated when the focus evaluation value calculated for each column of the slice images I1, I2, . . . , Ik is used. It may be anticipated that the slope of the slide 12 for the Y-axis direction is estimated by using the focus evaluation value calculated for each row of the slice images I1, I2, . . . , Ik.

Referring to part (a) of FIG. 5, the focus evaluation value may be calculated by the unit of a pixel in a first slice image I1. In FIG. 5, a sign for the pixel is assigned to each pixel based on the column and the row. For example, a pixel at a second row H2 of a second column V2 is assigned with a sign as 'px_22', and a pixel at an m-th row Hm of the second column V2 is assigned with a sign as 'px_2m'. A mean of a focus evaluation value for the column V2 may be obtained by calculating the focus evaluation value for each pixel from the pixel of px_21 to the pixel of px_2m, and averaging the calculated focus evaluation values. Further, a mean of focus evaluation values for the column V1, and columns V3 to Vn of the first slice image I1 may be obtained. Referring to part (b) and (c) of FIG. 5, a mean of focus evaluation values of columns V1 to Vn for a second slice image I2 to a k-th slice image Ik may be obtained. According to the mode of obtaining the focus evaluation values, it may also be possible that calculating focus evaluation values for pixels at the first column V1 to a last column Vn is omitted in some cases. Further, the mean of the focus evaluation values is not calculated with respect to all columns of each of the slice images I1, I2, . . . , Ik, but it may also be possible to calculate the mean of the focus evaluation values while omitting or skipping some columns.

As described above, the mean of the focus evaluation values for the columns of the slice images I1, I2, . . . , Ik may be used for estimating the slope of the slide 12 for the x-axis direction. A mean of focus evaluation values for the rows of the slice images I1, I2, . . . , Ik may be used for estimating the slope of the slide 12 for the y-axis direction.

Hereinafter, it will be described that the slope of the slide 12 for the x-axis direction is estimated.

Figure 6:
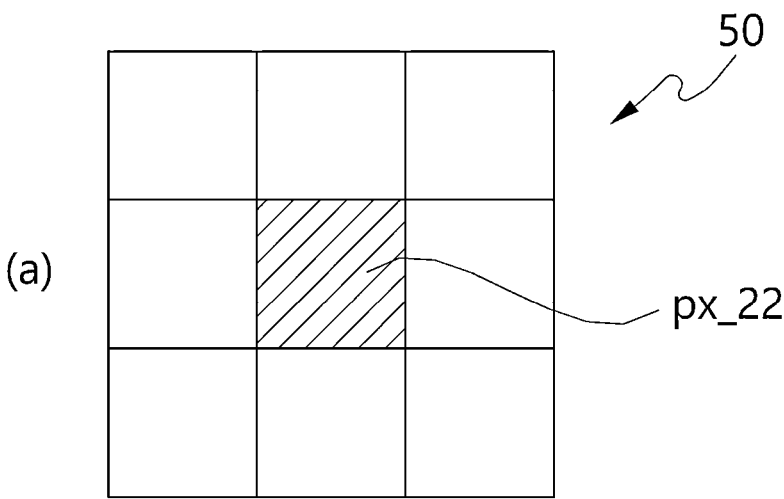
FIG. 6 is a diagram illustrating one example of calculating the focus evaluation value in the slide scanning device according to an exemplary embodiment of the present invention.
Figure 7:
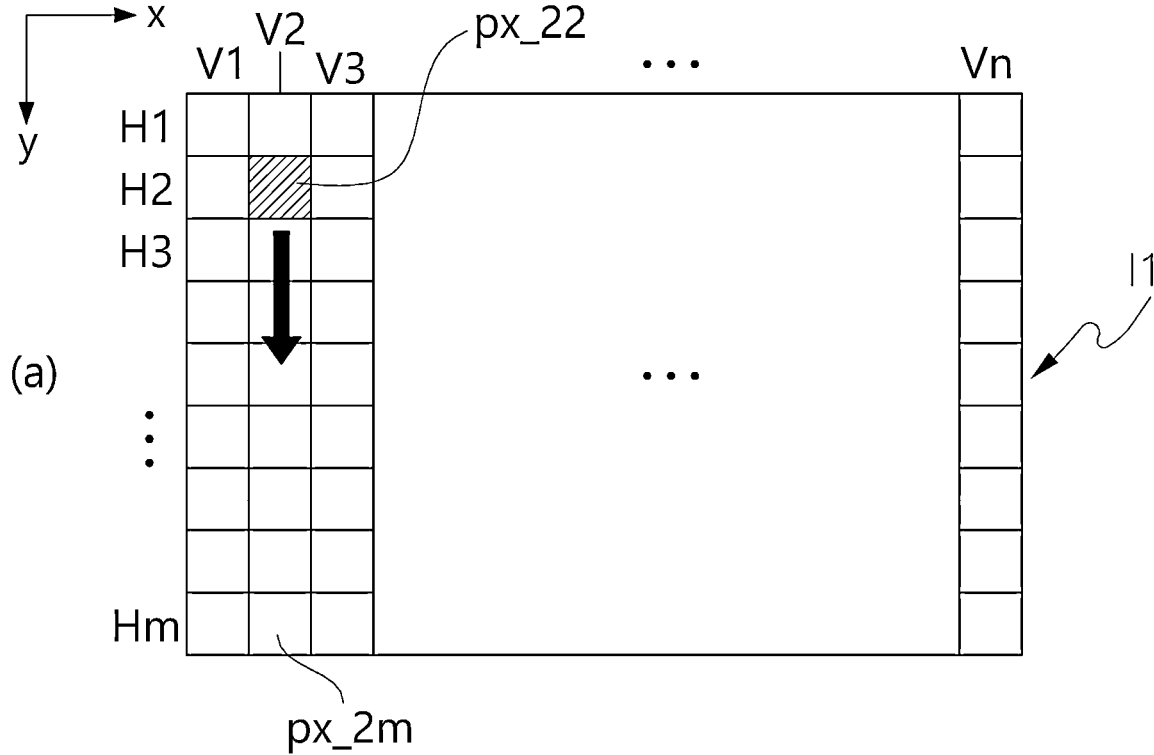
FIG. 7 is a diagram illustrating calculating the focus evaluation value for each column in any one slice image of the Z-stack images in the slide scanning device according to an exemplary embodiment of the present invention.

FIG. 6 is a diagram illustrating one example of calculating the focus evaluation value in the slide scanning device according to an exemplary embodiment of the present invention, and FIG. 7 is a diagram illustrating calculating the focus evaluation value for each column in any one slice image of the Z-stack images in the slide scanning device according to an exemplary embodiment of the present invention.

The focus evaluation value is to evaluate whether the focus is matched in the corresponding portion.

As a method for evaluating the focus, various techniques may be used, which include a method using a Tenengrad function, a method using a Squared Gradient function, a method using a Brenner function, a method using a Variance function, a method using a Laplacian function, etc.

As an example, the Tenengrad function is expressed by a square of a result of applying an operator in order to emphasize a difference of a gradient by using a Sobel operator which obtains vertical and horizontal gradients in an image. A Tenengrad evaluation value T(I) defined for an input image I(x, y) may be expressed as in Equation 1, and S(x, y) in Equation 1 may be represented as in Equation 2.

$$T(I) = \sum_x \sum_y [S(x, y)]^2 \qquad \text{[Equation 1]}$$

$$S(x, y) = \sqrt{G_x^2(x, y) + G_y^2(x, y)} \qquad \text{[Equation 2]}$$

In Equation 2, gradients $G_x(x\ y)$ and $G_y(x, y)$ are obtained by performing a convolution for the x-axis operator and the y-axis operator presented in part (b) of FIG. 6 to a 3×3 sliding window 50 including the pixel px_22 illustrated in part (a) of FIG. 6, respectively.

In an exemplary embodiment, the value of the pixel included in the sliding window 50 may be an intensity of the corresponding pixel. When the image is a gray scale, a gray value of the pixel may be used, and when the image is a color image, a mean of corresponding pixel data obtained from R, G, and B channels of the pixel, respectively may be used.

Referring to part (a) of FIG. 7, in column V2, the slope calculation unit 38 of the scanning control unit 30 calculates a focus evaluation value for the pixel px_22, and then calculates a focus evaluation value for each pixel of column V2 while moving the sliding window 50 in the y-axis direction. After calculating the focus evaluation values for the pixels of column V2, the slope calculation unit 38 calculates a mean of the focus evaluation values for the pixels of column V2. The slope calculation unit 38 also calculates a mean of focus evaluation values for columns V3 to Vn−1 respectively. A mean of focus evaluation values for columns V2 to Vn−1 of the first slice image I1 of the stack is illustrated in part (b) of FIG. 7. In FIG. 7, a mean of focus evaluation values is not presented with respect to column V1 and column Vn, and column V1 and column Vn may be included or excluded according to a focus evaluation value calculation mode.

FIG. 8 is a diagram illustrating calculating a mean of the focus evaluation values for each column with respect to each slice image of the Z-stack images in the slide scanning device according to an exemplary embodiment of the present invention, and FIG. 9 is a diagram illustrating that the mean of the focus evaluation values is normalized for each column with respect to each slice image of the Z-stack images in the slide scanning device according to an exemplary embodiment of the present invention.

Referring to FIG. 8, a mean of focus evaluation values for respective columns V2 to Vn−1 is illustrated with respect to each of the slice images I1 to Ik of the z-stack images Izs. A maximum value of a mean of focus evaluation values of the column at the same location may be derived in the slice images I1 to Ik. As an example, when targeting column V2, means of focus evaluation values of the first slice image I1, the second slice image I2, the third slice image 13, the fourth slice image 14, and the k-th slice image Ik are 52380, 32340, 52480, 52380, and 32400, respectively, and a maximum value of the means is 52480 in the third slice image 13. This means that the focus evaluation value in the third slice image 13 is most excellent in column V2 of the slice images I1 to Ik.

Referring to FIG. 9, it is illustrated that with respect to columns at the same location of the slice images I1 to Ik, the mean of the focus evaluation values is normalized with a maximum value of means of focus evaluation values of the corresponding column.

Figure 10:
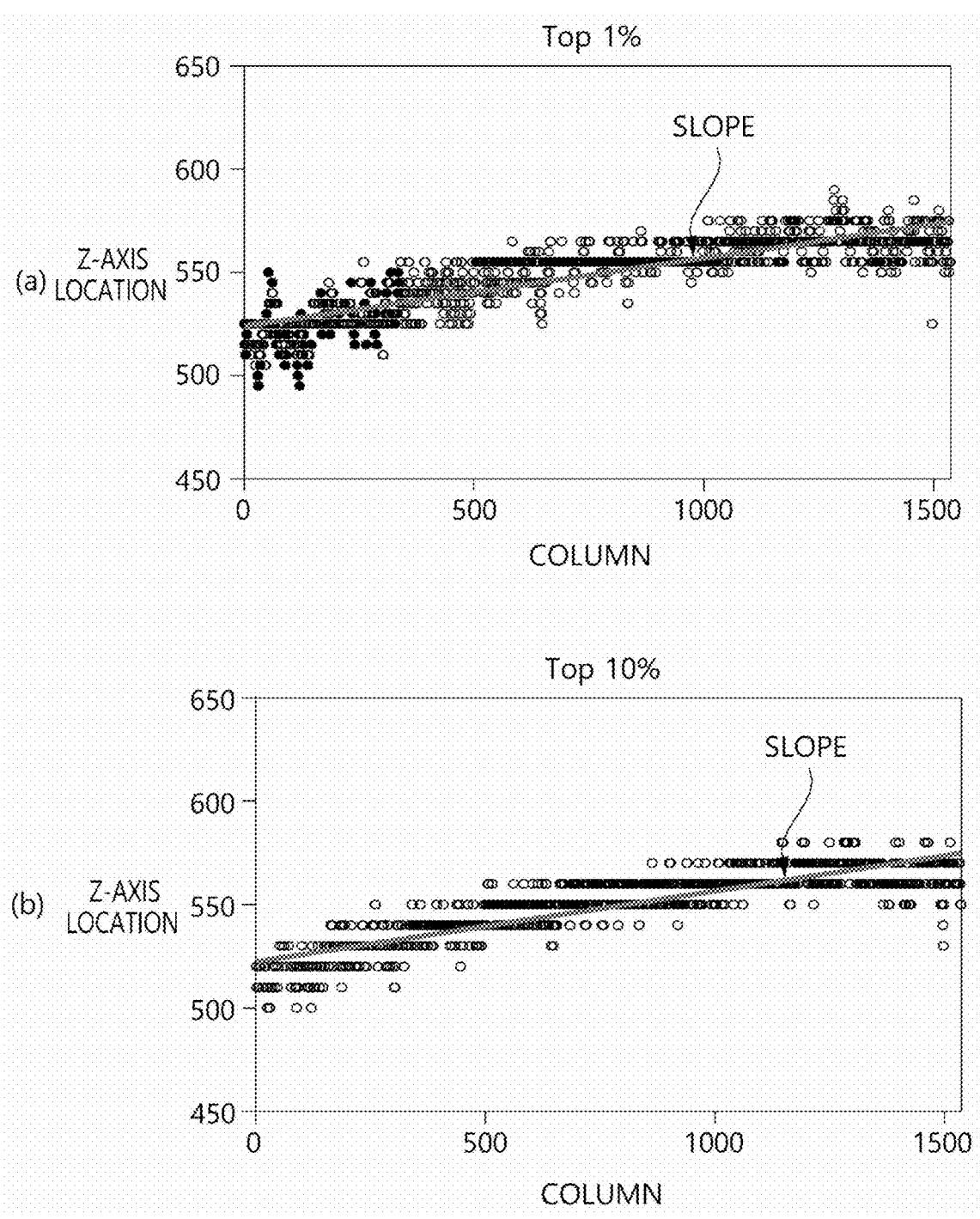
FIG. 10 is a diagram illustrating one example of estimating a slope by using top values of the normalized means of the focus evaluation values for each column in the slide scanning device according to an exemplary embodiment of the present invention.
Figure 11:
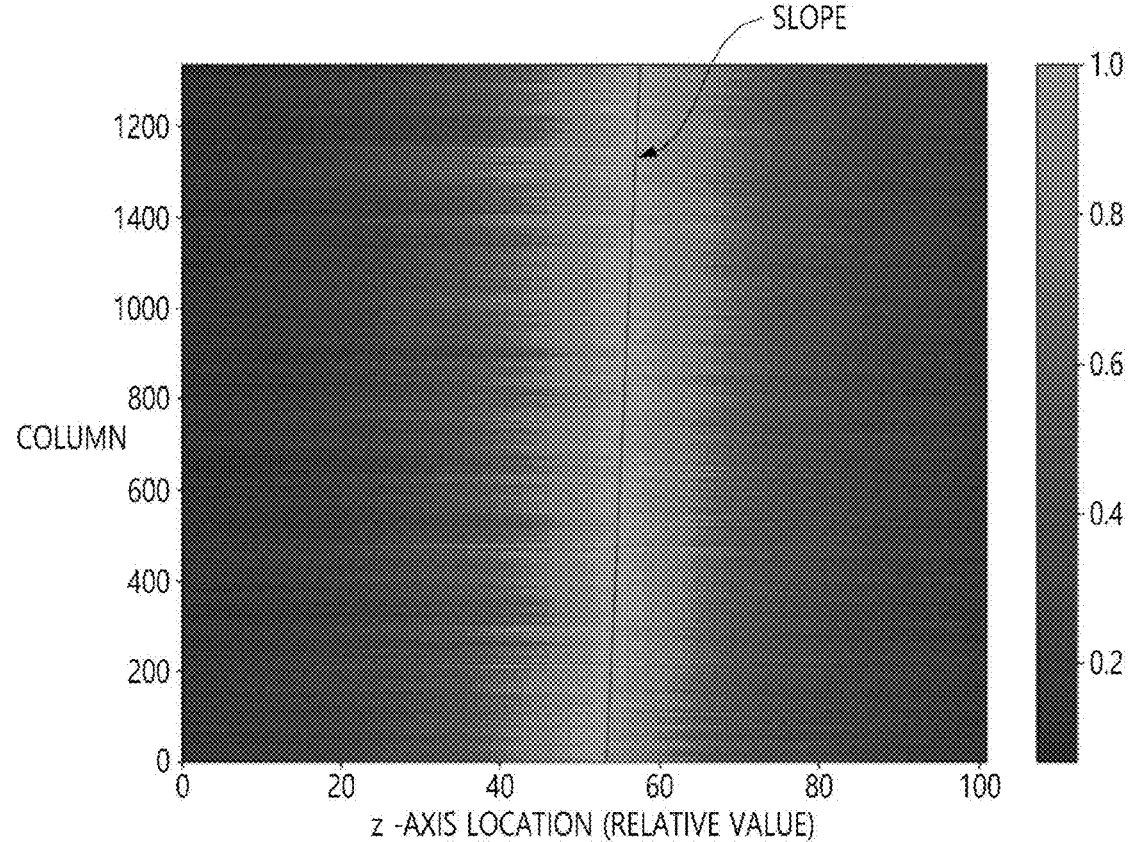
FIG. 11 is a diagram illustrating, as a heat map, the normalized means of the focus evaluation values for each column in the slide scanning device according to an exemplary embodiment of the present invention.
Figure 12:
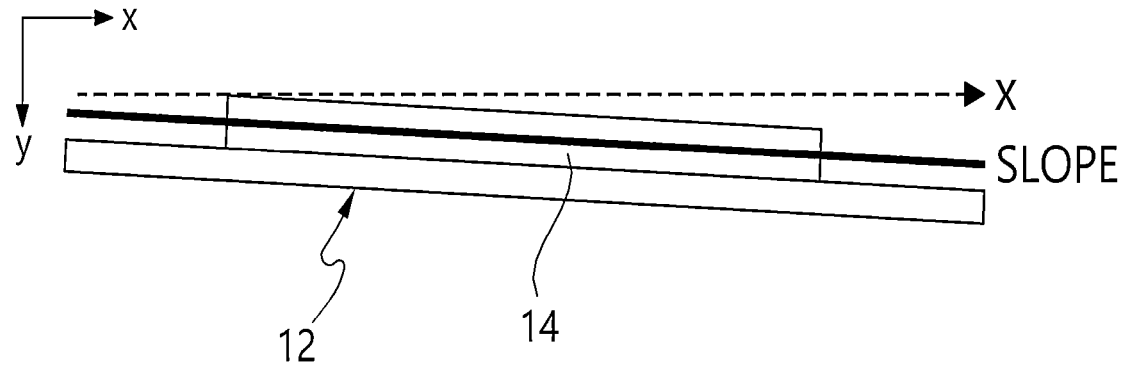
FIG. 12 is a diagram exemplarily illustrating a state in which the slide is tilted at a predetermined slope in the slide scanning device according to an exemplary embodiment of the present invention.

FIG. 10 is a diagram illustrating one example of estimating a slope by using top values of the normalized means of the focus evaluation values for each column in the slide scanning device according to an exemplary embodiment of the present invention, and FIG. 11 is a diagram illustrating as a heat map the normalized means of the focus evaluation values for each column in the slide scanning device according to an exemplary embodiment of the present invention. Further, FIG. 12 is a diagram exemplarily illustrating a state in which the slide is tilted at a predetermined slope in the slide scanning device according to an exemplary embodiment of the present invention.

Part (a) of FIG. 10 illustrates that top 1% among the means of the focus evaluation values of the respective columns, which are normalized are extracted, and part (b) of FIG. 10 illustrates that top 10% among the means of the focus evaluation values of the respective columns, which are normalized are extracted.

Referring to part (a) and (b) of FIG. 10, it may be confirmed that a z-axis location becomes larger where the mean of the focus evaluation values is higher from the left to the right of the column. This is because since the slide 12 is tilted with respect to the x axis as in FIG. 12, an area of the sample 14 where the focus evaluation value is excellent becomes deeper from the left to the right (a z value becomes larger).

An actual size (i.e., a column-specific width of the z-stack images Izs) according to one pixel in the FOV and a distance according to the z-axis location in FIG. 10 may be known from a setting value (e.g., an interval between slice images, Δz) of the slide scanning device 1. As a result, z-axis locations (e.g., top 1 to 10%) of top values of the means of the focus evaluation values are confirmed for each column, and a linear regression is applied to a relationship of the z-axis location for the column to obtain the slope, and the slope may be estimated as the slope of the slide 12.

Referring to FIG. 11, by setting a vertical direction as the columns of the slice images I1 to Ik, and a horizontal direction as the z-axis location, means of focus evaluation values normalized in respective columns are represented as a heat map. In FIG. 11, when points where the normalized mean of the focus evaluation values is high are connected, the slope of the slide 12 may be estimated similarly as in FIG. 10.

Hereinabove, the method for estimating the slope of the slide 12 in the x-axis direction is described, and when the same mode is applied to the rows of the slice images I1, I2, . . . , Ik, the slope of the slide 12 in the y-axis direction may be estimated.

Figure 13:
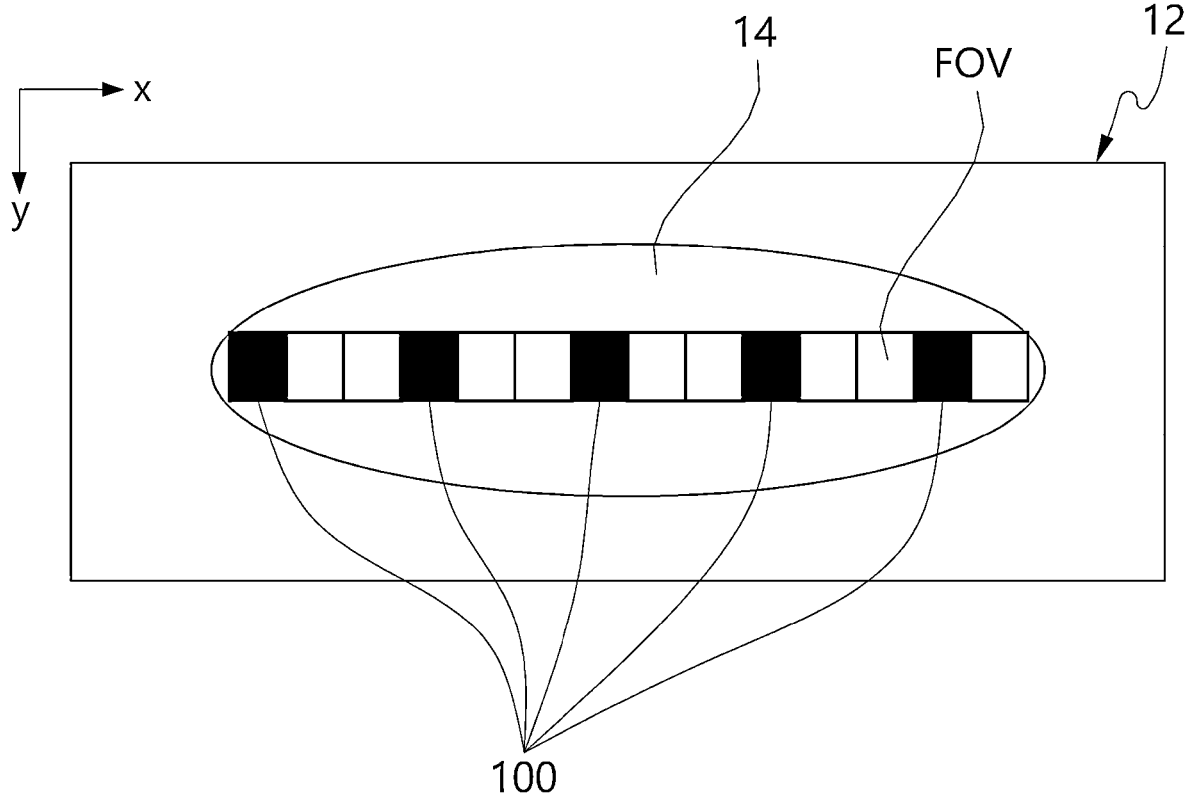
FIG. 13 is a diagram illustrating one example of generating a focus map in the slide scanning device according to an exemplary embodiment of the present invention.

FIG. 13 is a diagram illustrating one example of generating a focus map in the slide scanning device according to an exemplary embodiment of the present invention.

Referring to FIG. 13, a focus map generation FOV 100 is set which is used for generating a focus map among all FOVs which may be set on an upper surface of the sample 14 put on the slide 12. In FIG. 13, the FOV is represented as one column, but actually, an FOV of a 2-dimensional array form may be set, and some FOVs among all FOVs which are settable may be used as the focus map generation FOV 100.

The main control unit 32 of the scanning control unit 30 controls the drive control unit 36 and the image photographing unit 20 to acquire z-stack images for the focus map generation FOV 100 and transfer the acquired z-stack images to the focus map generation unit 40. The focus map generation unit 40 selects an ideal focal location (in other words, a z-axis location in which the focus of the image is most excellent) by evaluating the z-stack images for the focus map generation FOV 100 to generate a focus map for scanning the sample 14.

In the prior art, the focus map is generated without considering the physical slope of the slide 12.

In this regard, in the present invention, the focus map generation unit 40 sets the focal location by reflecting the slope calculated by the slope calculation unit 38 to an FOV positioned between any one focus map generation FOV 100 and another focus map generation FOV 100 adjacent thereto, with respect to the focus map generated according to the ideal focal location in the focus map generation FOV 100 to correct the focus map.

Further, in the exemplary embodiment of the present invention, the focus map generation unit 40 may be possible to generate the focus map like the prior art, and the main control unit 32 may also be possible to adjust a focal location according to movement of the FOV by referring to the slope the slide 12 calculated by the slope calculation unit 38 and the focus map generated by the focus map generation unit 40. For example, with respect to a subsequent FOV, a z-axis direction displacement is calculated by using an x-axis direction movement distance according to the movement of the FOV, and the slope calculated by the slope calculation unit 38 to adjust the focal location of the image photographing unit 20.

Further, in the exemplary embodiment of the present invention, the location of the FOV for generating the focus map and the location of the FOV for calculating the slope of the slide 12 may be different from each other, but it is also possible to use z-stack images obtained in one FOV for both generating the focus map and calculating the slope of the slide.

Figure 14:
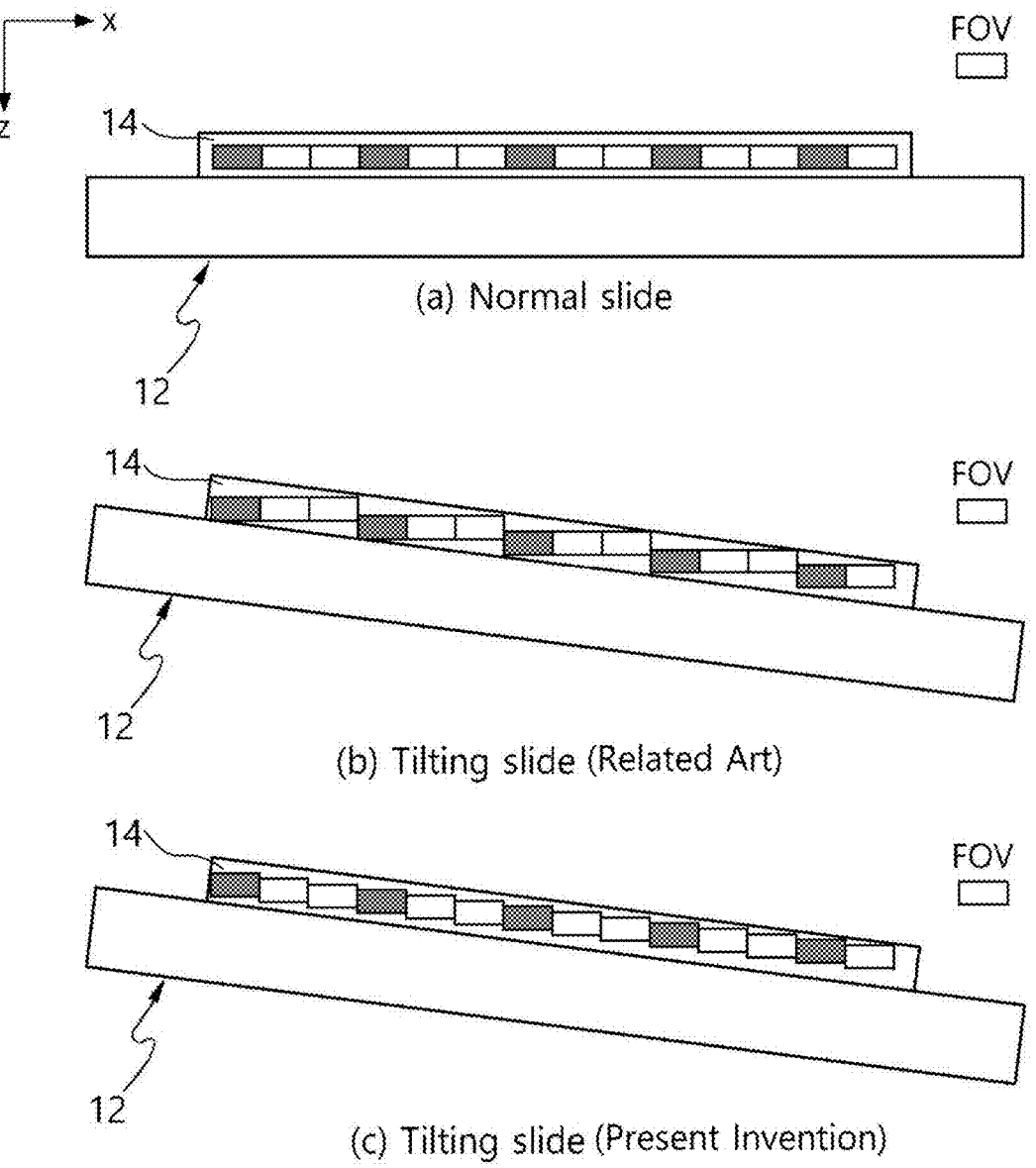
FIG. 14 is a diagram illustrating a comparison between a focus adjustment feature when performing the slide scanning by using the slide scanning device according to an exemplary embodiment of the present invention and the related art.

FIG. 14 is a diagram illustrating a comparison between a focus adjustment feature when performing the slide scanning by using the slide scanning device according to an exemplary embodiment of the present invention and the prior art.

In FIG. 14, a small rectangle is displayed as FOV, and a rectangular filled with a shade is illustrated as a focus map generation FOV for generating the focus map, and it is assumed that a z-axis direction location illustrated in FIG. 14 is a location where the image is in focus.

When the slide 12 is disposed at a right angle with respect to the optical axis 26 of the image photographing unit 20 as in part (a) of FIG. 14, there is no large difference between the prior art and the present invention in terms of a scanning result.

When the slide 12 is tilted as in part (b) of FIG. 14, a focal location in a subsequent FOV is set according to the focal location set in the focus map generation FOV in the related art, so there is a problem in that the image in the subsequent FOV is not well in focus.

In this regard, as in part (c) of FIG. 14, when the present invention is applied, the focal location is adjusted by considering the slope of the slide 12 with respect to an FOV between the focus map generation FOVs to obtain an image which is well in focus.

FIG. 15 is a flowchart illustrating a method for determining a slide slope of the slide scanning device according to an exemplary embodiment of the present invention.

The scanning control unit 30 of the slide scanning device 1 drives the image photographing unit 20 and/or the stage 10 to move the FOV to an area to be analyzed in the slide 12 (S10).

The scanning control unit 30 sets a z range to be photographed and an interval $\Delta z$ (S20).

The scanning control unit 30 controls the image photographing unit 20 and the z-axis drive unit 28 so as to photograph the images at the interval $\Delta z$ set within the corresponding FOV to obtain z-stack images including a plurality of slice images (S30).

The scanning control unit 30 calculates a mean of focus evaluation values for each column with respect to each slice image of the z-stack images (S40). In any one slice image, a mean of focus evaluation values for one column may be calculated by calculating a focus evaluation value with respect to respective pixels which belong to the corresponding column, and acquiring a mean of focus evaluation values of the pixels.

The scanning control unit 30 normalizes data with a maximum value among means of focus evaluation values of columns at the same location in the slice images of the z-stack images (S42). In an exemplary embodiment, by dividing the mean of the focus evaluation values of the respective columns at the same location in each of the plurality of slice images by the maximum value, the mean of the focus evaluation values may be normalized.

The scanning control unit 30 extracts a z-axis location of normalized data having top values for each column of the z-stack images (S44). In an exemplary embodiment, in respect to the top values, the normalized mean of the focus evaluation values in the corresponding column may be selected within top 10%, within top 5%, or within top 1%.

The scanning control unit 30 calculates a slide slope for an x-axis direction by using the location of each column of the z-stack images and a z-axis location of normalized data having a top value in the corresponding column (S46).

The scanning control unit 30 calculates a mean of focus evaluation values for each row with respect to each slice image of the z-stack images (S50). In any one slice image, a mean of focus evaluation values for one row may be calculated by calculating a focus evaluation value with respect to respective pixels which belong to the corresponding row, and acquiring a mean of focus evaluation values of the pixels.

The scanning control unit 30 normalizes data with a maximum value among means of focus evaluation values of rows at the same location in the slice images of the z-stack images (S52). In an exemplary embodiment, by dividing the mean of the focus evaluation values of the rows at the same location in each of the plurality of slice images by the maximum value, the mean of the focus evaluation values may be normalized.

The scanning control unit 30 extracts a z-axis location of normalized data having top values for each row of the z-stack images (S54). In an exemplary embodiment, in respect to the top values, the normalized mean of the focus evaluation values in the corresponding row may be selected within top 10%, within top 5%, or within top 1%.

The scanning control unit 30 calculates a slide slope for an y-axis direction by using the location of each row of the z-stack images and a z-axis location of normalized data having a top value in the corresponding row (S56).

In the exemplary embodiment of the present invention, both the calculation of the slope of the slide for the x-axis direction according to steps S40 to S46 above, and the calculation of the slope of the slide for the y-axis direction according to steps S50 to S56 above may be performed or it is also possible to calculate only any one slope.

Further, the calculation of the slope of the slide may be performed by setting one FOV in the sample of the slide, but it may also be possible that slopes are calculated and utilized with respect to FOVs at a plurality of locations. As an example referring to FIG. 13, it is possible that the slope of the slide is calculated for any one FOV among the focus map generation FOVs 100, or it is also possible that the slope of the slide is calculated and utilized with respect to two or more or all FOVs among the focus map generation FOVs 100.

Figure 16:
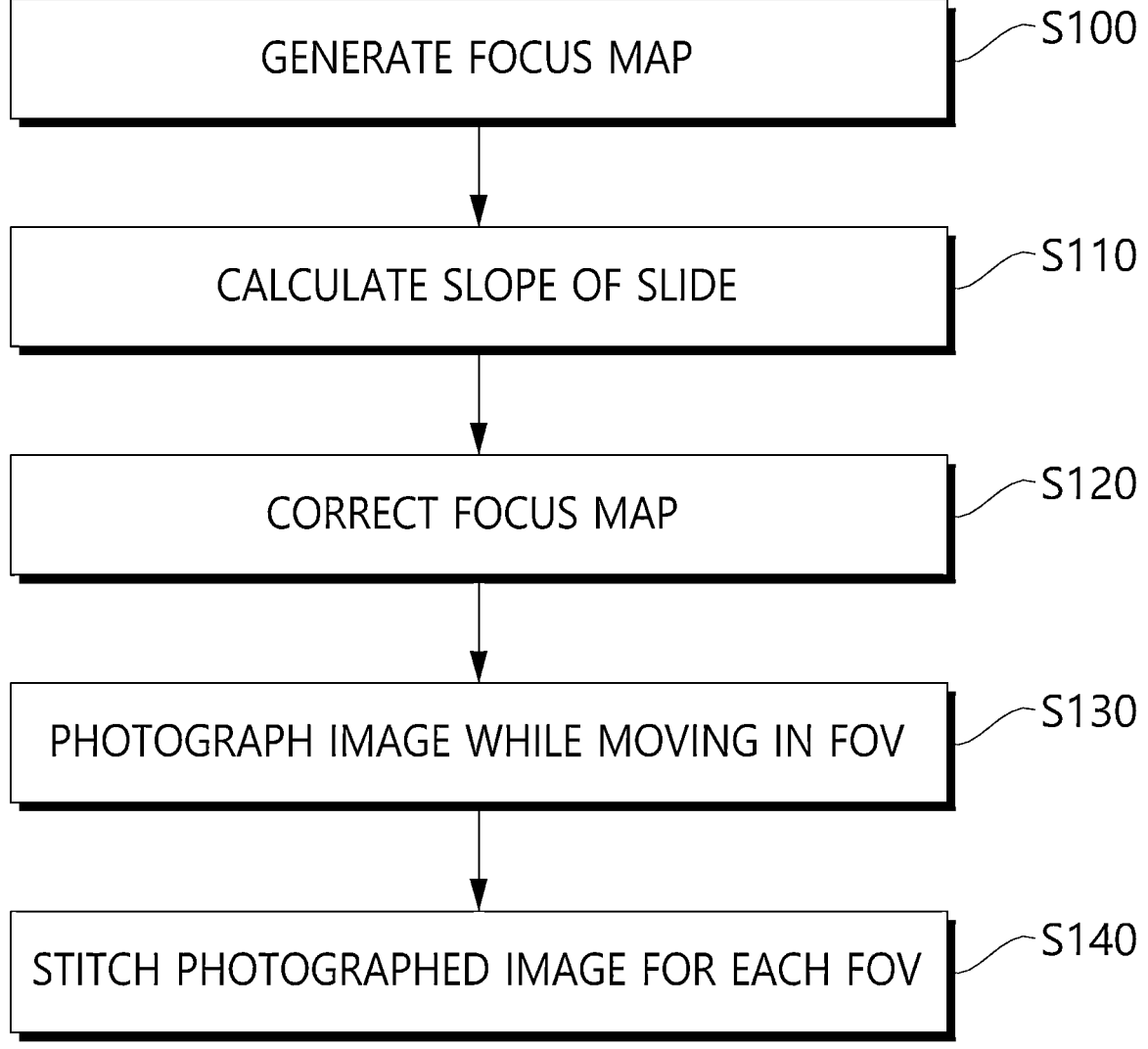
FIG. 16 is a flowchart illustrating a method for controlling the slide scanning device according to an exemplary embodiment of the present invention.

FIG. 16 is a flowchart illustrating a method for controlling the slide scanning device according to an exemplary embodiment of the present invention.

The slide scanning device starts to run while the slide 12 is mounted on the stage 10 of the slide scanning device 1.

The scanning control unit 30 sets the focus map generation FOV for the sample 14 of the slide 12, and obtains the z-stack images for the focus map generation FOV to generate a focus map for the sample 14 (S100).

The scanning control unit 30 sets the FOV at a predetermined location of the sample 14 of the slide 12, and obtains and processes the z-stack images for the FOV to calculate the slope of the slide (S110). In an exemplary embodiment, the slope of the slide may be calculated by using the z-stack images obtained from at least one of the focus map generation FOVs in step S100.

In an exemplary embodiment, the scanning control unit 30 may correct the focus map by using the slope of the slide (S120). In some cases, when the slide scanning is performed by using the focus map generated in step S100 without correcting the focus map, the scanning control unit 30 is also possible to control the operation of the image photographing unit 20 by considering the slope of the slide.

The scanning control unit 30 drives the image photographing unit 20 and the stage 10 to photograph the image while moving in the FOV of the image photographing unit 20 (S130). The image photographed by the image photographing unit 20 according to each FOV may be a tile image.

The scanning control unit 30 stitches the tile image photographed for each FOV to generate an image for the sample 14 (S140).

The embodiments of the present invention may be represented by functional block configurations and various processing steps. The function blocks may be implemented by various numbers of hardware or/and software configurations for performing particular functions. For example, the embodiment may employ integrated circuit configurations, such as memories, processing, logics, and look-up tables, that may perform various functions under the control of one or more microprocessors or other control devices. The constituent elements of the present invention may be executed as software programs or software elements. Similarly, the embodiments may be implemented in programming or scripting languages, such as C, C++, Java, assembler, and the like, including various algorithms implemented as data structures, processes, routines, or combinations of other programming configurations. The functional aspects may be implemented as algorithms executed by one or more processors. In addition, the embodiment may employ the technologies in the related art for electronic environment configuration, signal processing, and/or data processing. The terms "mechanism," "element," "means," and "component" may be used broadly and are not limited to mechanical and physical configurations. The terms may include the meaning of a series of routines of software in conjunction with a processor or the like.

The above description just illustrates the technical spirit of the present invention and various changes, modifications, and substitutions can be made by those skilled in the art to which the present invention pertains without departing from an essential characteristic of the present invention. Therefore, the exemplary embodiments and the accompanying drawings disclosed in the present invention are used to not limit but describe the technical spirit of the present invention and the scope of the technical spirit of the present invention is not limited by the exemplary embodiments and the accompanying drawings. The protection scope of the present invention should be construed based on the following appended claims and it should be appreciated that the technical spirit included within the scope equivalent to the claims belongs to the scope of the present invention.

What is claimed is:

1. A method for determining a slope of a slide in a slide scanning device, the method comprising:

obtaining, by a scanning control unit of a slide scanning device, z-stack images for at least a partial area of a sample disposed on a slide, the z-stack images including a plurality of slice images;

extracting, by the scanning control unit, a z-axis location of each of the plurality of slice images in which a focus evaluation value along a plurality of lines is equal to or higher than a predetermined value within a predetermined ranking as a slope calculation z-axis location, the plurality of lines being a plurality of rows, respectively, or a plurality of columns, respectively; and calculating, by the scanning control unit, a first slope by using a distance according to a location of a horizontal plane of the plurality of lines and the slope calculation z-axis location, and estimating the first slope as a slope of the slide, wherein the extracting includes:

calculating a mean focus evaluation value for each of the plurality of lines in each of the plurality of slice images;

obtaining a maximum value among the mean focus evaluation values for respective lines of the plurality of slice images that are coincident along a z-axis; and normalizing the mean focus evaluation values for the respective lines that are coincident along the z-axis with the maximum value, and wherein the calculating of the first slope includes calculating the first slope by using the normalized mean focus evaluation values.

2. The method of claim 1, wherein in the extracting, the plurality of lines include a first line to an m-th line (m is a natural number of 2 or more), the plurality of slice images include a first slice image to a k-th slice image in a z-axis direction, the scanning control unit calculates focus evaluation values of the first line to the m-th line of each of the first slice image to the k-th slice image, and the scanning control unit extracts, as the slope calculation z-axis location, the z-axis location of each of the plurality of slice images in which the focus evaluation value is equal to or higher than the predetermined value within the predetermined ranking with respect to each of the first line to the m-th line.

3. The method of claim 2, wherein each of the focus evaluation values of the first line to the m-th line is a mean of focus evaluation values acquired by averaging focus evaluation values of pixels included in a corresponding line with respect to each of the first line to the m-th line of each of the first slice image to the k-th slice image.

4. The method of claim 3, wherein the mean of the focus evaluation values is normalized with a maximum value among the means of the focus evaluation values included in the corresponding line with respect to each of the first line to the m-th line.

5. The method of claim 4, wherein the slope is calculated by applying a linear regression by using the normalized focus evaluation values.

6. The method of claim 3, wherein the focus evaluation value of each of the pixels is calculated by using any one of a Tenengrad function, a Squared Gradient function, a Brenner function, a Variance function, or a Laplacian function.

7. The method of claim 1, wherein the estimated slope is a slope at which the slide forms with respect to a plane perpendicular to an optical axis of an image photographing unit.

8. The method of claim 1, wherein the plurality of lines are the plurality of columns of the z-stack images, and the estimated slope is a slope of the slide in a first direction.

9. The method of claim 1, wherein the plurality of lines are the plurality of rows of the z-stack images, and the estimated slope is a slope of the slide in a second direction.

10. A slide scanning device, comprising:

a stage having a slide mounted thereon;

an image photographing unit configured to acquire an image of a sample of the slide; and a scanning control unit configured to control the image photographing unit or the stage to scan the image of the sample, wherein the scanning control unit includes a slope calculation unit configured to perform the method for determining the slope of the slide of claim 1.

11. The slide scanning device of claim 10, wherein the scanning control unit further includes a focus map generation unit configured to search focal locations in a focus map generation FOV in z-stack images obtained in focus map generation FOVs at a plurality of locations of the sample, and generating a focus map for the sample.

12. The slide scanning device of claim 11, wherein the scanning control unit is configured to set a focal location of the image photographing unit in a specific FOV according to the focus map, and adjust the focal location of the image photographing unit in an FOV subsequent to the specific FOV according to the slope of the slide estimated by the slope calculation unit.

13. The slide scanning device of claim 11, wherein the focus map generation unit is configured to the focus map according to the slope of the slide estimated by the slope calculation unit.

14. The slide scanning device of claim 11, wherein the slope calculation unit is configured to estimate the slope of the slide by using the z-stack images acquired in at least one of the focus map generation FOVs.

15. A method for controlling a slide scanning device including a stage on which a slide is mounted, an image photographing unit acquiring an image of a sample of the slide, and a scanning control unit controlling the image photographing unit or the stage so as to scan the image of the sample, the method comprising:

a focus map generation step of searching, by the scanning control unit, a focal location in a plurality of focus map generation FOVs with respect to the sample, and generating a focus map;

a slide slope determining step of determining, by the scanning control unit, the slope of the slide of claim 1;

an image acquisition step of driving, by the scanning control unit, the image photographing unit and the stage to acquire a plurality of tile images for the sample by the image photographing unit; and an image generation step of stitching the plurality of tile images and generating a slide image for the sample.

16. The method of claim 15, wherein in the image acquisition step, the scanning control unit sets a focal location of the image photographing unit in a specific FOV according to the focus map, and adjusts the focal location of the image photographing unit in an FOV subsequent to the specific FOV according to the slope of the slide determined in the slide slope determining step.

17. The method of claim 15, further comprising:

a focus map correcting step of correcting the focus map according to the slope of the slide estimated by a slope calculation unit.

* * * * *